Jan. 20, 1959 J. L. GILLSON, JR 2,870,338

PHOTODIELECTRIC DEVICE AND PROCESS

Filed July 26, 1956

INVENTOR

JOSEPH L. GILLSON JR.

BY James H. Ryan

ATTORNEY

United States Patent Office 2,870,338

Patented Jan. 20, 1959

2,870,338

PHOTODIELECTRIC DEVICE AND PROCESS

Joseph L. Gillson, Jr., Wilmington, Del., assignor to E. I. du Pont de Nemours and Company, Wilmington, Del., a corporation of Delaware Application July 26, 1956, Serial No. 600,285

14 Claims. (Cl. 250—83.3)

Figure 1:
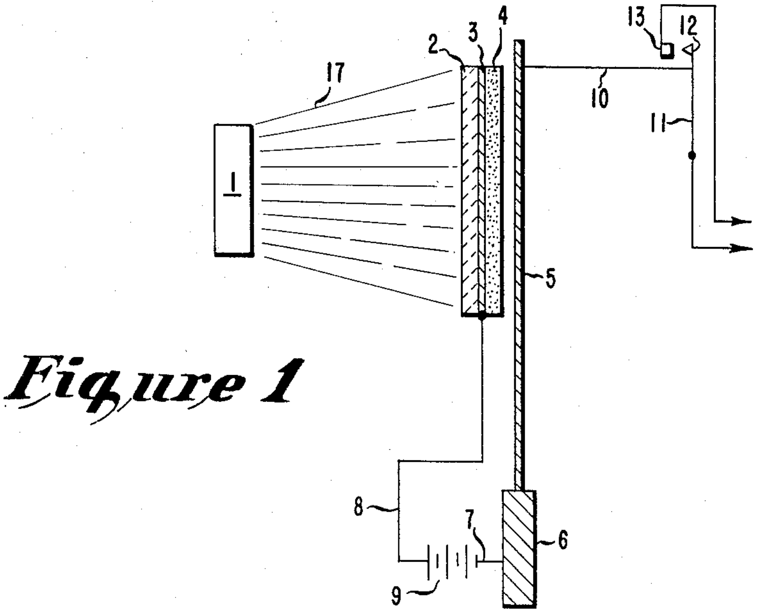

This invention pertains to the conversion of electromagnetic to mechanical energy and to a device for the direct control of mechanical energy by electromagnetic radiations.

The application is related to my copending application Serial Number 539,568, filed October 10, 1955.

The change in dielectric constant undergone by certain substances upon irradiation has been known for some time as shown, for example, by Leverenz, An Introduction to Luminescence of Solids, Wiley, New York (1950), p. 390. So far as known, no device has been developed heretofore taking advantage of this photodielectric effect for the control of mechanical energy. Photoelectric cells have hereofore represented almost the only means by which visible or more energetic electromagnetic radiation can be converted to or control mechanical energy.

A primary object of this invention is, consequently, the provision of a novel and useful method for converting electromagnetic energy to mechanical.

Another object is provision of a device for controlling mechanical energy by means of the effect of electromagnetic radiation of the wave-length of visible light or shorter on the dielectric constant of a dielectric substance.

The above-mentioned and yet further objects are achieved in accordance with this invention by a device comprising basically (*a*) a dielectric layer containing a finely-divided photodielectric material suspended in an insulating binder, (*b*) on one side of the dielectric layer a rigid electrically-conducting member transparent to electromagnetic radiation of the visible light-ultra violet light-X-ray range, (*c*) adjacent to the other side of the dielectric layer a movable, electrically-conducting member, and (*d*) electrical means to provide an electric field between the two conducting means. A source for directing electromagnetic radiations onto the photodielectric layer may also be provided although in some cases a natural source, such as the sun, may be relied upon.

When the device is in operation, the electrical field sets up an electrostatic force between the two electrically-conductive members, usually plates, as in an ordinary condenser. This electrostatic force is dependent on the dielectric constant of the dielectric layer, again as in a condenser. Since this dielectric is a photodielectric, the electrostatic force can be changed by varying the intensity of the electromagnetic radiations incident on the transparent side of the condenser. The electrostatic force may alternatively be varied by varying the frequency of the electromagnetic radiation. In either case, the change in the electrostatic field or force thereupon causes movement of the movable member. This movement, an embodiment of mechanical energy, may be transmitted by suitable means and employed as desired. Thus the present invention may be used to control mechanical energy by means of electromagnetic radiations.

Figure 2:
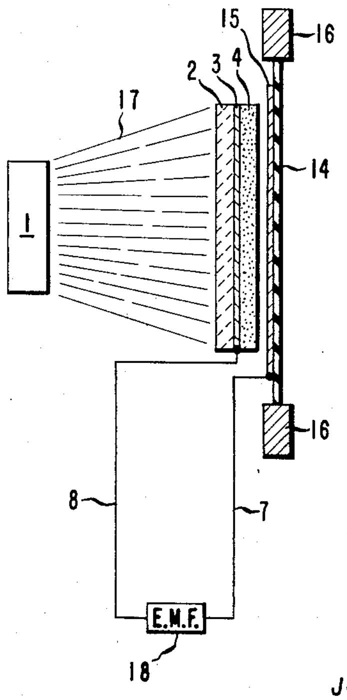

The invention will be understood in more detail from the remainder of the specification and from the accompanying drawings in which:

Figure 1 is a side view, in section, of a preferred embodiment of the invention; and Figure 2 is a side view, also in section, of a second embodiment of the invention employing the mechanical motion of the movable conducting layer to generate sound.

In Figure 1, electromagnetic radiation 17, generally of a wave length of about 7,700–0.1 A, i. e., visible or ultra violet light or X-rays, is supplied by a suitable source 1. The radiation passes through a transparent rigid plate 2, such as glass, having on one surface a transparent electrically-conductive layer 3, e. g., a layer of tin oxide. Incident radiation 17 strikes particles of a finely-divided photodielectric, e. g., particles of zinc sulfide, in layer 4. These photodielectric particles are dispersed in a light-transparent dielectric medium, e. g., beeswax, preferably adherent to the conducting layer 3.

Member 5 is a conducting plate or layer, parallel with, and preferably close to, the surface of the dielectric layer. The plate is at least partially movable but is fastened at one end to a suitable supporting base 6. The conducting plate is self-supporting and can be moved by the electrostatic forces built up in the condenser. It can be either a thin resilient sheet of metal rigidly fastened to base 6 or a rigid metal sheet hinged thereto. Layers 3 and 4 and 5 in effect comprise a condenser.

Base 6 and conducting layer 3 are connected by suitable electrical leads 7 and 8 to a source of direct voltage 9, e. g., a battery. When the resulting electric field is impressed across the dielectric and electromagnetic radiation striking the same is modulated, the dielectric constant of the particles of photo-dielectric is changed. As described above, change in dielectric constant modulates the electrostatic force acting on the condenser plates. The change in the electrostatic force causes movement in conducting plate 5 which is translated by connecting mechanical linkage 10 to a lever 11 which may close or open the contacts 12 and 13. These contacts may be in an electrical circuit being controlled (not shown). Controls 12 and 13 in the electrical circuit may normally be either open or closed, as desired.

As noted, Figure 2 shows details of an embodiment of the device of this invention used to generate sound by electromagnetic radiation. Reference numerals identical with numerals in Figure 1 represent identical parts. In Figure 2 the assembly of a rigid transparent plate 2 having an electrically-conducting layer 3 adjacent and attached to a photodielectric layer 4 are of the same construction as illustrated in Fig. 1. In this embodiment, however, a movable conducting plate on layer 15 is attached to a flexible diaphragm 14, e. g., a sheet of rubber, supported on its circumference by a metal ring 16.

The two conducting layers 3 and 15 are connected by suitable electric leads to a generator for a voltage or E. M. F. represented by 18. This generator may produce a constant voltage, as does battery 9, or an alternating voltage. When the intensity of electromagnetic radiation striking layer 4 is varied, a change in the dielectric constant of 4 takes place. As described, this change in dielectric constant results in a movement of plate 15. When the intensity changes in the electromagnetic radiations occur at a rate in the range of 20–20,000 cycles/second, and constant voltage is provided by generator 18, the movement of the diaphragm 14 generates audible sound.

When generator 18 produces an audio-frequency alternating voltage, the device illustrated by this figure produces sound which may be intensity-modulated. In this embodiment of the invention, the alternating voltage impressed on the conducting layers 3 and 15 results in a varying electrostatic force on the condenser causing movable conducting layer 15 and diaphragm 14 to vibrate continuously with the generation of audible sound. When the intensity of the electromagnetic radiations impinging on the photodielectric layer 4 is modulated, the accompanying modulation of the electrostatic force acting on the condenser plates results in a corresponding modulation of the intensity of the sound being produced by the vibrating layers 15 and 14.

It will be apparent that, with a fixed source of artificial radiations, the apparatus of either Figure 1 or Figure 2 can be employed much as a common photoelectric cell. A body passing between the source and the photodielectric condenser will interrupt the radiation and by means of the cell and associated equipment, operate a burglar alarm, a door, or any other suitable mechanism.

The photodielectric materials operable in the device of this invention are known substances whose dielectric constants change on irradiation with visible or ultra violet light or with X-rays. Zinc sulfide and cadmium sulfide particles are examples of specific photodielectrics useful in the device of this invention. Commercially available materials are satisfactory for use in this device. Mixtures of photodielectrics are also usable.

The dielectric medium in which the photodielectric particles are dispersed can be any of a wide variety of light- and X-ray-transmitting dielectric materials. In addition to the beeswax mentioned previously, polymeric materials may be employed. Suitable polymers are polystyrene, polymethyl methacrylate, ethylcellulose, cellulose nitrate, plasticized polyvinyl chloride, and the like. Ratios of the amounts of photodielectric particles and transparent dielectric medium can vary widely, ratios ranging from 1:2 to 1:8 being operable The rigid transparent layer 2, which renders the dielectric accessible to radiation, has been described with particular reference to a glass plate having a conductive layer of tin oxide. This portion of the device may, however, be made of other transparent materials and other conductive layers. It may, for example, be made of ploymeric materials such as ethylcellulose, cellulose nitrate, polyvinyl chloride, or the like, having an electrically-conducting layer on one surface. Since more energetic radiation than visible light can be employed in some instances, it is not always essential that the layer be transparent to such light. The electrically-conducting layer should preferably be located between the transparent rigid layer and the dielectric layer since this arrangement permits the use of lower electric potentials applied to the conducting layers.

The movable, electrically-conducting layer of the device may be made of a variety of metals and in various shapes. It can, for example, be a foil, an evaporated film, or a plate. Aluminum foil is quite satisfactory for cementing to a rubber diaphragm in the type of device illustrated by Fig. 2. Sheet brass is satisfactory in an apparatus of the type illustrated in Fig. 1. These movable conductive layers should be arranged so that their surfaces are close to the surfaces of the photodielectric dispersion layer in order that an adequate electric field can be impressed on the photodielectric particles with moderate applied voltages. An air space of about 2–15 mils in thickness between the dielectric layer and the movable conducting layer is satisfactory.

In general, electromagnetic radiation of less than about 7,700 A. in wave length may be used in the device of this invention. In particular, radiations of about 0.1–7,700 A. in length, including visible and ultra violet light and X-rays, are suitable. Both cadmium and zinc sulfides are photodielectrics operable with electromagnetic radiations within this entire range of wave lengths. Particularly good results are, however, obtained with specific photodielectrics used with specific ranges of radiation. Cadmium sulfide is, for example, particularly well suited for operating the device of this invention with light of 3500–5500 A. On the other hand, zinc sulfide is particularly satisfactory with radiation in the range of 2500–4000 A.

A wide range of electric field conditions can be used in the photodielectric device of this invention. Alternating electric fields in the photodielectric layer of about 200 R. M. S. (root mean square) volts/mil and 1000 cycles/second are suitable. Direct current electric fields in the photodielectric layer of about 200 volts/mil are suitable. The value of the voltage used in any particular case depends on the particular application in which the device is being used and on the construction thereof, in particular the thickness of the dielectric layer and the space between the dielectric and movable layers.

The employment of the present photodielectric device to control electric motors, burglar alarms, and the like and to generate or modulate sound are but a few of its many specific applications. It can, for example, control electrical circuits to provide a warning of excess X-ray radiation in the atmosphere. Other applications will be evident to those skilled in the art.

The embodiments of the invention in which an exclusive property or privilege is claimed are defined as follows:

1. Apparatus for converting the energy of incident electromagnetic radiation of a wave-length of less than about 7,700 A. to mechanical energy which comprises: a first, fixed, electrically-conductive member; a second, at least partially movable, electrically-conductive member, the second and first members isolated from each other to prevent the passage of current therebetween; a dielectric positioned between said first and second members accessible to said incident electromagnetic radiation, the dielectric possessing a dielectric constant variable with changes in the electromagnetic radiation; and means for impressing an electrical potential between said first and second members; the second member moving when (1) an electrical potential is impressed between it and the first member and (2) change occurs in the incident electromagnetic radiation, thereby converting energy of the incident radiation to mechanical energy.

2. The apparatus of claim 1 in which the incident electromagnetic radiation has a wave length between about 7,700 A. and 0.1 A.

3. The apparatus of claim 1 in which the first member is transparent to said incident electromagnetic radiation and the radiation has access to the dielectric therethrough.

4. The apparatus of claim 1 in which the first member is glass coated on one side with an electrically-conductive material transparent to visible light.

5. The apparatus of claim 4 in which the electrically-conductive material is tin oxide.

6. The apparatus of claim 1 in which the dielectric comprises particles of a photodielectric, the dielectric constant of which changes with changes in electromagnetic radiation, embedded in a dielectric material transparent to said radiation.

7. The apparatus of claim 6 in which the photodielectric is a member of the group consisting of cadmium and zinc sulfides.

8. The apparatus of claim 1 in which the second member is a metal sheet hinged to a base.

9. The apparatus of claim 1 in which the second member comprises metal mounted on a non-conductive resilient base.

10. The apparatus of claim 1 in which the electrical potential impressed between the first and second members is steady.

11. The apparatus of claim 1 in which the electrical potential impressed between the first and second members is alternating.

12. The method of converting electromagnetic energy to mechanical energy which comprises (1) establishing an electrical potential between a fixed and a movable plate, thereby setting up an electrostatic field between the plates, said plates being separated by a dielectric the dielectric constant of which is changed by changes in incident electromagnetic radiation, and (2) changing the electromagnetic radiation incident upon the dielectric, thereby altering the dielectric constant of the dielectric and the electrostatic field and causing motion of the movable plate.

13. The method of claim 12 in which the change in electromagnetic radiation is in the intensity thereof.

14. The method of claim 12 in which the change in electromagnetic radiation is in the frequency thereof.

No references cited.